April 4, 1944.  J. MIHALYI  2,346,076
COMBINED VIEW AND RANGE FINDER FOR CAMERAS
Filed June 19, 1942  2 Sheets-Sheet 2

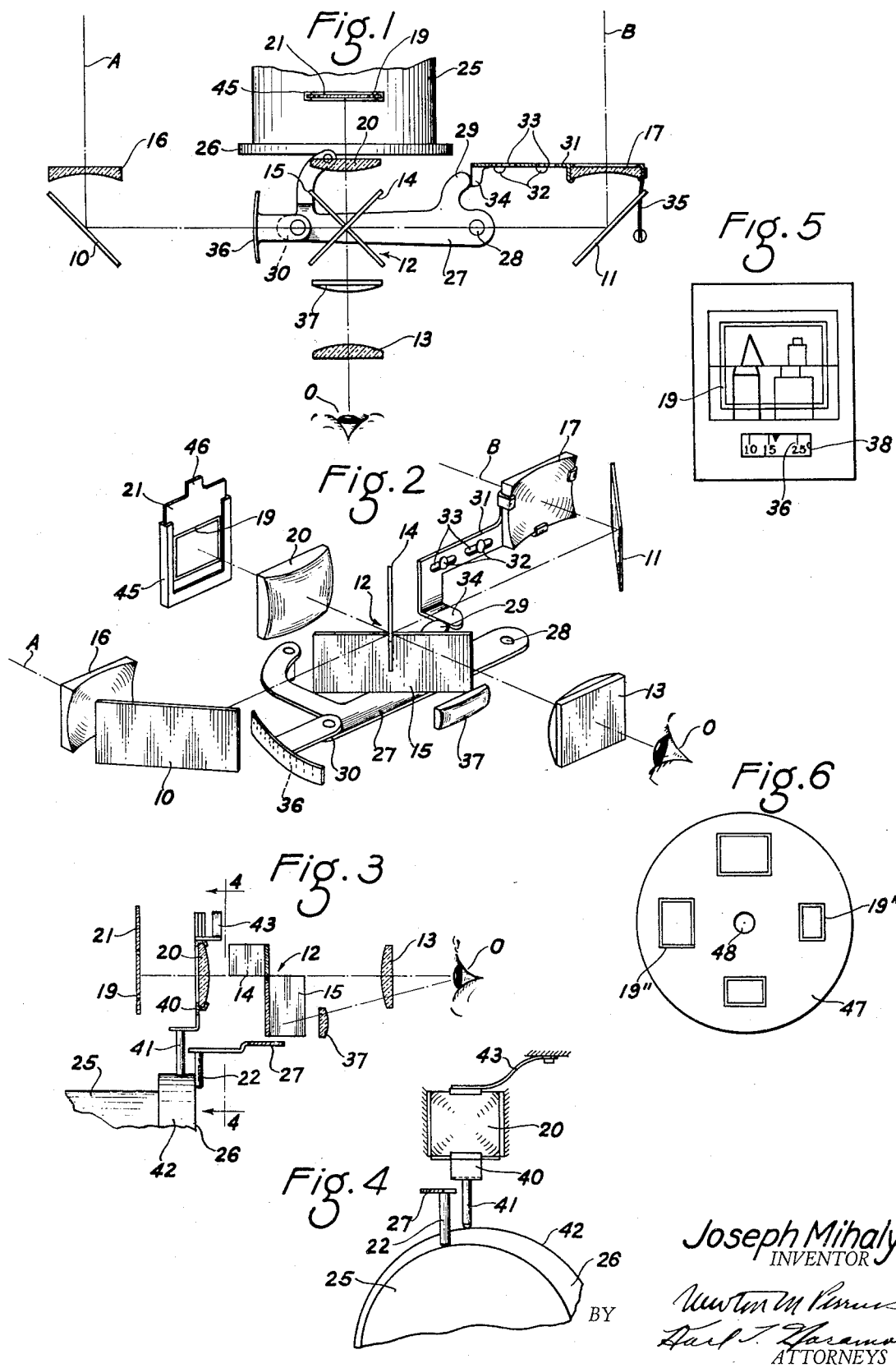

Joseph Mihalyi
INVENTOR

BY
ATTORNEYS

Patented Apr. 4, 1944

2,346,076

UNITED STATES PATENT OFFICE 2,346,076

COMBINED VIEW AND RANGE FINDER FOR CAMERAS

Joseph Mihalyi, Rochester, N. Y., assignor to Eastman Kodak Company, Rochester, N. Y., a corporation of New Jersey Application June 19, 1942, Serial No. 447,648

17 Claims. (Cl. 95—44)

The present invention relates to a combined view and range finder, and to an optical system particularly for combining a coincident type range finder with a parallax-free direct view finder.

It has often been proposed to construct a base type range finder so as to employ one, or both, of the ranger finder beams for showing the field of view which the camera will photograph. However, the optical requirements for view finding differ from those for range finding and make it difficult to satisfy both requirements without sacrifice. The ideal direct view finder should have independent optical systems for viewing the subject and the frame line defining the field, and should have the frame line adjacent to the subject itself to provide what is known in the art as a parallax-free view finder. While such view finders are referred to in the art as parallax-free, they are not to be confused with view finders adjusted according to the focus of a camera, or the distance of an object, to correct for parallax at different distances.

The difficulty with the usual view finders is that the field defining frame is located close to the point of observation while the object appears to be at a great distance in front of the frame. The result is that when the observation point, or eye, is shifted but slightly the frame appears to move over the object and alter the field of view. This effect is known as parallax in view finders and is very undesirable because the field limited by the frame is not necessarily that covered by a camera lens. Furthermore, when the frame appears too close to the eye it is difficult, if not impossible, to focus simultaneously on both the frame and the object at the same time with the result that the frame appears blurred. Parallax can be entirely overcome in view finders if the field frame can be made to appear at the same distance as the object, as set forth above, however, parallax in a view finder can be sufficiently reduced to be tolerable and the frame and object can be made to appear simultaneously in focus if the frame can be made to appear at a sufficient distance from the eye, e. g., two feet or more. This could be done by making a view finder of such dimensions that the frame is actually spaced the required distance from the observation point, but such an arrangement is not practical where the view finder is to be mounted on a small hand camera. The same result can be obtained in a practical manner by providing an optical system which will form a virtual image of the frame at a distance from the observation point.

Therefore, the primary object of the present invention is to provide a combined view and range finder system in which a finder field limiting frame is presented in the field of view, free, or substantially free, from parallax with respect to the object in the finder field.

Another object of the invention is the provision of the combined view and range finder system in which the view finder is one of the ideal type having independent optical systems for viewing the subject and the frame lines defining the field, the optical system for viewing the object being a part of the optical system of the range finder.

Another object of the invention is the provision of the combined view and range finder of the type set forth in which a semi-transparent reflecting means is used to combine the beams of the range finder and view finder for simultaneous observation.

And another object is to provide a combined view and range finder of the type set forth in which the range finder is of the coincident type and said semi-transparent reflecting means constitutes the combining unit of the range finder optical system.

A further object of the invention is the provision in a combined view and range finder of the type set forth of means for adjusting the view finder for parallax according to different object distances.

And yet another object is to couple the view finder adjusting means with the focusing mechanism of a camera when used in connection therewith so that the finder is automatically corrected for parallax as the camera is focused on objects at different distances.

And another object is to provide in a combined view and range finder of the type set forth, when used on a camera adapted to use lenses of different focal lengths, means whereby the size of the finder field can be changed to correspond to the field of the focal length lens being used.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings in which:

Fig. 1 is a plan view, partly in section, of the optical system and certain adjustable parts of a combined view and range finder constructed in accordance with the present invention, and shown in association with a camera lens and a part of the focusing mechanism therefor.

Fig. 2 is a view in perspective of the arrangement shown in Fig. 1 and omitting the camera parts for purposes of clarity.

Figure 7:
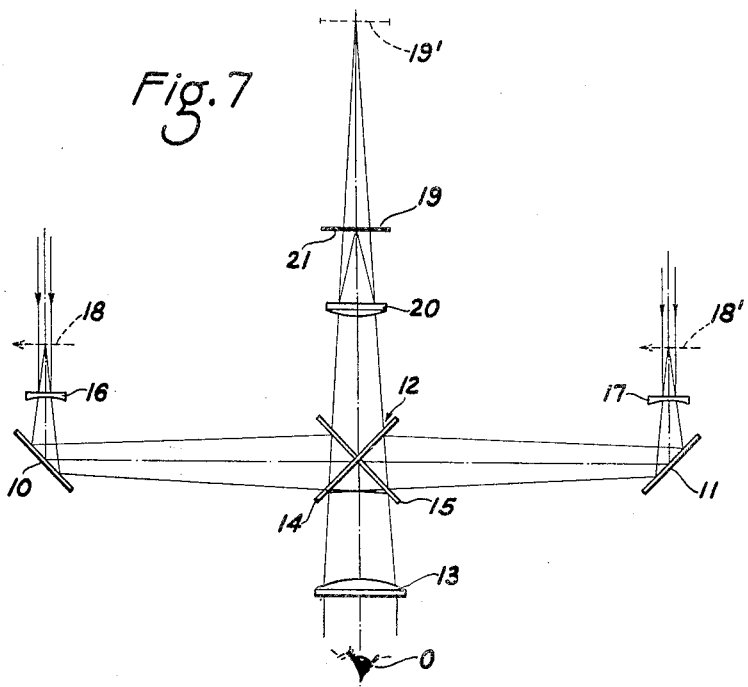
Figure 8:
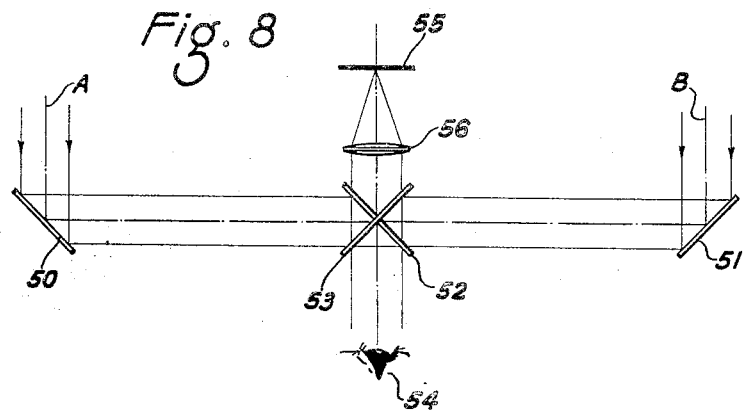

Fig. 3 is a side view of Fig. 1, partly in section, and showing means for correcting the view finder for parallax operated by the focusing mechanism of the camera lens, Fig. 4 is a view taken substantially on line 4—4 of Fig. 3, Fig. 5 shows the field of view as observed through the finder system shown in Figs. 1, 2, and 3, Fig. 6 is a view showing how a plurality of field frames of different size might be mounted to be moved into operative relation with the optical system to correspond with different focal length lenses, Fig. 7 is a diagrammatic view showing the operation of the optical system of Fig. 1, and Fig. 8 is a diagrammatic view showing the optical system and the operation thereof of a second embodiment of the invention.

Like reference characters refer to corresponding parts throughout the drawings.

As is well known to those skilled in the art, ordinary view finders used on cameras are inaccurate and troublesome because the field frame does not always depict the field which is covered by the camera lens. This is due in part to the fact that with view finders having bare field frames which are viewed through an eye-piece spaced from the frame, or with the negative lens type view finder which forms a virtual image of the object in front of the frame, the field frame and object never appear to be in the same plane, but the field frame appears closer than the object and too close to the observation point. Due to this discrepancy in finder frame and object distances, and particularly to the fact that the frame appears too close to the observation point, the frame appears to move relative to the object when the eye is moved and this condition is referred to as parallax in view finders, or view finder parallax.

However, this parallax is not to be confused with the parallax in a camera view finder due to different distances of objects focused on by a camera lens, and which parallax must be corrected for by tilting the axis of the finder relative to the optical axis of the camera lens in accordance with the object distance so that the finder field will correspond to that covered by the camera lens. To clearly distinguish between these two forms of parallax in this specification, parallax due to the finder frame being too close to the observation point and not appearing in the plane of the object will be referred to as view finder parallax; while the parallax due to different object distances, and correctable by changing the tilt of the view finder axis relative to the optical axis of the camera lens, will be referred to broadly as parallax of the whole combined range of view finder system. It might be pointed out that if the optical system of the view finder is such that the field frame appears to be beyond the object distance, rather than in front of it as is usually the case, and as might be true when photographing close-ups, when the eye is moved the object will appear to move relative to the field frame. This condition also gives view finder parallax, but the same is not as critical as when the frame appears in front of the object, and furthermore, this condition rarely arises in most photography and even then is tolerable except for the most precise work. This is true because the object distance can never be so close to the observation point as the actual frame might be, and generally is, e. g., two to four inches, but always appears at a sufficient distance from the observation point to eliminate the greater parallax difficulty.

The ideal parallax-free view finder would have the field frame appear adjacent, or in approximately the same plane as the subject itself. This is most conveniently done by having independent optical systems for viewing the subject and the frame. However, a view finder in which the frame appears at a substantial distance from the observation point will reduce the parallax effect to tolerable limits whether or not the frame and object appear at exactly the same distance as in the case of an ideal view finder which is absolutely free of parallax. I have found that so long as the field frame is made to appear at a distance within the range of the range finder, e. g., two feet to infinity, whether the image of the frame and object appear at the same optical distance and the view finder is parallax-free, the parallax of the view finder will be sufficiently reduced to be tolerable and the frame and object will both simultaneously appear in focus at the observation point. According to the present invention, I have combined a range and view finder in such a way that the view finder has independent optical systems for viewing the subject and the field frame, one of said independent optical systems being a part of the range finder optical system. The beams of the range finder optical system are relied upon to view the object, and a field frame defining means is provided and combined with the range finder optical system so as to form a virtual image of a field frame at a distance approximately optically equivalent to the subject distance, or at a distance within the range of the range finder, and combine this virtual image with the combined beams of the range finder system so that the frame and image can be simultaneously viewed in focus. Means are also provided for correcting the finder for parallax due to different object distances and/or altering the field frame size in accordance with different focal length lenses which might be used on a camera.

In Fig. 1, a preferred embodiment of the invention, particularly adapted for use on a small hand camera, is illustrated as comprising two horizontally spaced light deflecting members 10 and 11 for accepting separated measuring beams A and B respectively, and determining the base of the range finder system. The beams A and B are bent through 90 degrees by the deflecting elements 10 and 11, respectively, and are directed to a combining unit, indicated generally as 12, which combines the two beams and directs them through an ocular 13 to an observation point O. In Fig. 1, I have shown a coincident type range finder of the split-field type and in which the combining unit comprises two vertically disposed deflecting members 14 and 15 symmetrically located relative to the two deflecting members 10 and 11 on the base of the range finder. As is well known, in a split-field type of coincident range finder one part of the combining unit deflects one part of the field to the observation point and the other part deflects the remainder of the field to the observation point in juxtaposed, or adjacent, relationship with the first part of the field. To this end the upper deflecting unit 14 directs the upper half of the beam B to the observation point, and deflecting unit 15 directs the lower half of the beam A to the observation point. To provide a negative lens type finder system there is positioned in the beams A and B, negative lenses 16 and 17, respectively, which forms virtual images 18 and 18' of the objects, as indicated in Fig. 7.

In order to provide a combined range and a parallax-free view finder, or a view finder in which the parallax is reduced to tolerable limits, the deflecting units 14 and 15 of the combining unit are made semi-transparent reflecting members so that an image of the field frame can be viewed directly therethrough. These members may be half-silvered mirrors, as shown, or could be half-silvered prisms or other equivalent optical elements if desired. To one side of the range finder beams and directly in line with the observation point O and in front of the combining unit 12 there is located a view finder frame defining means which comprises a field frame 19 and a positive lens 20. The field frame may be of any suitable form, but I have shown as a preferable structure a plate 21 of opaque material having formed therein a transparent finder field limiting frame which appears as a line of light at the observation point. It will be readily appreciated by one skilled in the art that this field frame could be formed by a dark line on a white plate, or could be just a wire frame.

In order to provide a parallax-free view finder it is necessary to make the image of the field frame appear at approximately the same distance as the object at the observation point. To this end, positive lens 20 is of such power and is located at such a distance from the frame in front of the semi-transparent reflecting means 14 and 15 as to form a virtual image 19' of the finder frame 19 at a distance in front of the lens which is optically equivalent, or approximately so, to the distance of the virtual images 18 and 18' when said object is at infinity, or is at a distance of 25 feet to infinity. The operation of the optical system is clearly illustrated in Fig. 7, and it is pointed out that the optical distances from the center of the combining unit 12 to the virtual image 19' of the field frame, and from the center of the combining unit 12 to each of the virtual images 18, 18' of the object is optically equivalent, or approximately so. Therefore, the light from the frame will pass through the semi-transparent reflecting combining unit 12 to the observation point O and will be combined with the combined range finder beams A and B to frame the field of view presented by said means. Inasmuch as the virtual images of the frame and object appear at the same, or approximately the same, distance the view finder will be parallax-free and the images of the optical frame will simultaneously appear in focus at the observation point. The images of the field and frame as viewed by an observer will appear as shown in Fig. 5. Then with the field frame defining means selected so that the virtual image of the frame is formed at the equivalent optical plane of the virtual image of the object when said object is at infinity the view finder will be absolutely parallax-free so long as the object is at, or beyond, approximately 25 feet, and within which range the camera including such a system would be used the majority of the time.

It might be pointed out that with this arrangement as the object distance moves from infinity towards the negative lenses 16 and 17 the apparent distance of the virtual image thereof formed by said lenses will gradually become less so that in order to make the virtual image of the finder frame appear at exactly the same distance as the apparent distance of the image of the object, the distance between the positive lens 20 and the frame 19 should be changed by moving either the positive lens 20 or the frame, one towards the other, when focusing on close objects to make the two images appear at exactly the same distance. However, the parallax introduced into the view finder system when the object is moved within infinity so that the image will appear closer than the frame image has been found to be negligible and tolerable without the correction set forth. This is because the object can never come within two feet of the observation point, the lower range limit of the range finder system, and so long as the object is at a distance as great as this from the observation point parallax in the view finder will be tolerable and the image of the object and the frame image can be simultaneously viewed in focus.

While it is preferable to have the view finder frame defining means such that the virtual image of the frame 19 appears at infinity, it is pointed out that a view finder having a tolerable amount of parallax would be provided if the view finder frame defining means were such as to form a virtual image of the frame at, or beyond, the lower range limit of the range finder, e. g., two feet. As pointed out above, this would be true because in such an instance the frame would always appear at least two feet from the observation point and under which conditions the frame would not appear to move an appreciable amount relative to the object when shifting the observation point, or would be the equivalent of providing an ordinary frame type direct view finder and placing the finder frame thereof at least two feet from the observation point. Furthermore, when the frame image appears at least two feet from the observation point, the frame and objects can be simultaneously viewed in focus.

The combined range and view finder optical system above described is shown in Figs. 1, 2, and 3 as applied to a small hand camera, parts only of which are illustrated, having a lens mount 25 which is axially movable for focusing. The mount 25 carries a raised ring 26, or other suitable means, for engaging a pin 22 on an arm 27 pivoted at 28 and provided with two extensions 29 and 30, respectively, for actuating the range finder and indicating the range of the objects in a manner now to be described.

The negative lens 17 is mounted in the end of a bar 31 secured for horizontal movement on the camera by pins 32 projecting through horizontally elongated slots 33 provided in the bar. The bar carries a projecting part 34 arranged to engage the rounded end of the front extension 29 of the arm 27 and is suitably held in yielding engagement therewith by a spring 35.

Thus when the camera lens mount 25 is moved axially for focusing, a corresponding lateral movement is imparted to the negative lens 17, and the coupling arrangement is such that the adjacent images formed in the range finder will be in coincidence for objects at the distance for which the camera is focused. The setting of the range finder is indicated to the observer at the observation point O by means of a scale 36 movable with and carried by the extension 30 of the arm 27. Light from the scale 36 is reflected from the lower end of reflecting member 15, which is extended for this purpose as shown in Fig. 3, through a positive lens 37 to the observation point. As clearly shown in Fig. 3, the positive lens 37 is below the path of the combined range finder beams to the viewing position, and is viewed in a small window 38 in a frame, not shown, in which the ocular 13 might be mounted, and below the field of view at the observation point.

In order to compensate the system for parallax due to different object distances means are provided for shifting the field frame transversely of the field of view in accordance with different object distances. While this adjustment might be one manually carried out in accordance with the range reading, or known object distances, I have shown this adjustment coupled with the lens focusing mechanism so that parallax will automatically be compensated for by the focusing adjustment of the lens.

As a preferred manner of accomplishing this result, I have shown the positive lens 20 of the view finder frame defining means mounted in a support 40 which is mounted for vertical movement and which includes a foot 41 normally held in engagement with a peripheral cam 42 formed on the raised ring 26 on the end of the lens mount by a spring 43. Assuming of course that the lens mount rotates, as well as moving axially, when the lens is being focused, the positive lens 20 will be shifted laterally of the field frame 19 and the semi-transparent combining unit 12 to shift the image of the frame relative to the field of view. It is thus evident that lateral movement of the positive lens 20 caused by focusing of the camera lens will correspondingly raise and lower the image of the field frame relative to the field of view provided by the range finder beams to compensate for parallax for various distances for which the range finder is adjusted. While I have shown the positive lens 20 moved relative to the field frame and semi-transparent combining unit for the correction of parallax, it is pointed out that the same result could be obtained by laterally moving the field frame relative to the positive lens 20 and combining unit 12, or by rigidly connecting the positive lens 20 and the field frame 19 together and moving them together laterally of the semi-transparent combining unit.

In the event that this combined range and view finder system is to be used on a camera which is adapted to receive interchangeable lenses of different focal lengths it is necessary that it be possible to change the size of the finder frame to correspond with the field covered by a particular focal length lens being used. This change in frame size can be accomplished in a number of different ways, and I have shown two different ways which would be suitable. As clearly illustrated in Fig. 2, the plate 21 in which the field frame 19 is formed is adapted to be slid into the top of the holder 45 having guideways for engaging the edges of the plate and holding the same in definite spaced relation to the positive lens 20. A plurality of plates of the same dimension may each be provided with finder frames of different size, and each plate may include a finger tab 46 to facilitate changing the plates in the holder. In the event that it be undesirable to have a plurality of loose separate plates 21 which must be changed in the holder 45 to obtain finder frames of different size, it might be desirable to form a plurality of finder frames 19'' spaced in arcuate relationship on an opaque disk 47, see Fig. 6, and which disk may be rotatably mounted on an axle 48 relative to the optical system so that any one of the desired finder frames thereon may be moved into proper position relative to the positive lens 20 by merely rotating the disk.

In Fig. 8 I have shown a second embodiment of an optical system for a combined range and view finder constructed in accordance with the present invention. In this embodiment the range finder is also of the coincident type wherein spaced light beams A and B are accepted and deflected by reflecting members 50 and 51, respectively, to a combining unit consisting of two semi-transparent reflecting members 52 and 53 symmetrically located on the base of the range finder and which combine and direct the beams in a single direction to an observation point 54. The semi-transparent reflecting members 52 and 53 in this instance may be so constructed and arranged as to split the field as in the above-described preferred embodiment, or they may be so constructed and arranged as to combine the two complete fields in superposed relation as is well known in the art.

In this embodiment there are no lenses having power placed in front of the reflecting members 50 and 51 but the latter are situated behind beam entrance openings, not shown, which have no lenses covering the same, or have lenses of zero power forming protecting windows so that the object as observed at the observation point appears at its actual distance. The view finder frame defining means, as before, comprises a frame 55 and a positive lens 56 situated outside of the range finder beams and directly in line with the observation point in front of the semi-transparent reflecting members 52 and 53.

In order to provide a view finder which is absolutely, or substantially, free of parallax it is desirable to make the finder frame appear at the same, or an approximately optically equivalent distance as the object, or this criterion can be approached by making the field frame appear at a distance from the observation point within the range of the range finder, e. g., two feet to infinity as above set forth, as distinguished from a distance close to the observation point as is true of view finders which possess parallax properties which are intolerable. To this end, the positive lens 56 may be so positioned that the frame 55 is at its focal point and the lens forms a virtual image of the frame at infinity which is visible at the observation point. This would make the view finder absolutely free of parallax when the object was at infinity or beyond 25 feet. This range finder system may be automatically adjusted in accordance with the distance of the object by merely altering the angular relation of one of its reflecting members 50 or 51 relative to the other as is well known, instead of shifting the negative lens 17 as the negative lens type of the preferred embodiment.

The second embodiment is not as suitable for universal application to cameras as the preferred embodiment is because of the fact that the absence of lenses having power the deflecting members 50—53 must be relatively large to cover a field corresponding to the field of some camera lenses. This system would, however be entirely satisfactory on small hand cameras or motion picture cameras using the longer focal length lenses which have relatively small fields, or would be entirely satisfactory on larger cameras on which there would be sufficient space to accommodate the larger optical elements.

From the above description, it will be readily apparent that with a combined range and view finder constructed in accordance with the present invention, a view finder is provided which is entirely free of parallax for the major part of its use, and in which the parallax is reduced to tolerable limits throughout the remainder of its use. This condition is achieved by providing a view finder which has individual optical systems for viewing the subject and the frame defining the field, and having one of the systems projecting a virtual image of the frame a suitable distance in front of the observation point to both reduce, or overcome, parallax and at the same time provide for simultaneously viewing the frame and object in focus. The view finder is combined with a range finder of the coincident type in such a way that one of the optical systems of the view finder system is a part of the optical system of the range finder, one of the optical elements, the combining unit, or semi-transparent reflecting means, forming a part of both the range finder optical system and the view finder optical system, and properly combining the image of the frame with the combined beams of the range finder to superimpose the frame on the field of view at the observation point.

Although I have shown and described certain specific embodiments of my invention, I am fully aware that many modifications thereof are possible. My invention, therefore, is not to be limited to the precise details of construction shown and described but is intended to cover all modifications coming within the scope of the appended claims.

Having thus described my invention, what I claim as new and desire to secure by Letters Patent of the United States is:

1. An optical system for a combined view and range finder comprising in combination a range finder means for forming with light from an object two light beams from spaced view points, view finder frame defining means outside of the paths of the range finder beams, and including a frame and a positive lens near the frame for forming a virtual image thereof at a distance conjugate to the frame-to-lens distance, and means for combining said two range finder beams and the light from said frame for simultaneous viewing of the object at some apparent distance and the virtual image, the power of said lens and the distance to the frame being such that said virtual image is formed within the range of the range finder.

2. An optical system according to claim 1 in which the means for combining said two range finder beams and the light from said frame includes a semi-transparent reflecting means in line with the light from said frame.

3. An optical system for a combined view and range finder comprising in combination a range finder means for forming with light from an object two light beams from spaced view points, view finder frame defining means outside of the path of the range finder beams, and including a frame and positive lens near the frame for forming a virtual image thereof at a distance conjugate to the frame-to-lens distance, and a split semi-transparent reflector surface located so that each part thereof reflects one of the range finder beams into juxtaposition with the other for simultaneous viewing of the object at some apparent distance and light from the frame passes therethrough combined in superposed relation with said juxtaposed beams, the power of said lens and the distance to the frame being such that said virtual image distance is within the range of said range finder and the frame and object can be viewed simultaneously in focus.

4. An optical system according to claim 1 in which there is included means for transversely adjusting the position of said virtual image relative to the combined range finder beams.

5. An optical system according to claim 3 in which there is included means for transversely adjusting the position of said virtual image relative to the combined range finder beams.

6. An optical system for a combined view and range finder particularly adapted for use on a camera having a focusable lens, and including a mechanism for focusing said lens, and comprising in combination a range finder means for forming with the light from an object two light beams from spaced view points, view finder frame defining means outside of the path of the range finder beams, and including a frame and a positive lens near the frame for forming a virtual image thereof at a distance conjugate to the frame-to-lens distance, and means for combining said two range finder beams and the light from said frame for simultaneous viewing of the object at some apparent distance and the virtual image, the power of said lens and the distance to the frame being such that said virtual image distance is within the range of said ranger finder, and means for transversely adjusting the position of said virtual image relative to the combined range finder beams in accordance with the distance of said object from the focal plane of the camera lens to correct for parallax.

7. An optical system according to claim 6 in which the means for transversely adjusting the position of said virtual image relative to the combined range finder beams comprises mounting one of the members of the finder frame defining means so that it will move laterally relative to the other, and an operative coupling between said member and the focusing mechanism of the camera lens adapted to shift said member laterally of the other in accordance with the object distance, whereby the virtual image of the frame is automatically moved when the lens is focused to define the field of the camera lens at all times.

8. An optical system according to claim 6 in which the means for transversely adjusting the position of said virtual image relative to the combined range finder beams comprises mounting the frame defining means to move transversely of the combined range finder means, and an operative coupling between said frame defining means and the focusing mechanism of the camera lens adapted to shift said frame in accordance with the object distance, whereby the virtual image of the frame is automatically moved when the lens is focused to define the field of the camera lens at all times.

9. An optical system for a combined view and range finder particularly adapted for use on a camera adapted to receive interchangeable lenses of different focal length and including a mechanism for focusing said lenses, and comprising in combination a range finder means for forming with light from an object two light beams from spaced view points, view finder frame defining means outside of the paths of the range finder beams, and including a frame and a positive lens near the frame for forming a virtual image thereto at a distance conjugate to the frame-to-lens distance, and means for combining said two range finder beams and the light from said frame for simultaneous viewing of the object at some apparent distance and the virtual image, the power of said lens and the distance to the frame being such that said virtual image distance is within the range of said range finder, and means for varying the field size of frame in accordance with the focal length of the camera lens on the camera whereby the field of the view finder will correspond with the field of the lens being used.

10. An optical system according to claim 9 in which the view finder defining means and the means for varying the field size of said frame in accordance with the focal length of the lens being used on the camera consists of a holder for interchangeably receiving one of a plurality of frames of different sizes corresponding to the fields of the different focal length lenses, and a positive lens near the frame holder for forming a virtual image of the frame in the holder at a distance conjugate to the frame-to-lens distance.

11. An optical system according to claim 9 in which the view finder defining means and the means for varying the field size of said frame in accordance with the focal length of the lens being used on the camera consists of a holder on which a plurality of frames of different sizes are mounted in spaced relation, said holder movably mounted on the camera whereby any one of the frames may be alternately moved into finding position, and a positive lens near the frame holder and on the optical axis of the frame in the finding position for forming a virtual image of the frame in finding position at a distance conjugate to the frame-to-lens distance.

12. An optical system according to claim 9 and including means for transversely adjusting the position of said virtual image relative to the combined range finder beams in accordance with the distance of said object from the focal plane of the camera lens to correct for parallax.

13. An optical system for a combined view and range finder comprising in combination a beam accepting and combining unit for receiving two spaced beams of light coming from an object and directing them in combined relation to an observation point, and including a negative lens in each light beam for forming a virtual image of the object, a split semi-transparent reflecting surface for combining said beams and directing them to said observation point, view finder frame defining means outside of the path of the range finder beams, and including a frame and a positive lens of such power and so located relative to the frame as to form a virtual image of the frame at a distance within the range of said range finder, and means for combining the light from said frame with the combined range finder beams whereby the virtual images of said object and frame are adapted to be viewed in focus at the observation point.

14. An optical system for a combined view and range finder comprising in combination a beam accepting and combining unit for receiving two spaced beams of light coming from an object and directing them in combined relation to an observation point, and including a negative lens in each light beam for forming a virtual image of the object, a split semi-transparent reflecting surface for combining said beams and directing them to said observation point, view finder frame defining means outside of the path of the range finder beams, and including a frame and a positive lens located directly in line with said observation point and semi-transparent reflecting means and in front of said reflecting means, the power of said positive lens and the distance to the frame being such as to form a virtual image of the frame at a distance within the range of said range finder which is adapted to be viewed at said observation point simultaneously with said combined range finder beams.

15. An optical system for a combined view and range finder particularly adapted for use on a camera having a focusable lens, and including a mechanism for focusing said lens, and comprising in combination a beam accepting and combining unit having two spaced beams of light coming from an object and directing them in combined relation to an observation point, said unit including a negative lens in each light beam for forming a virtual image of the object, a split semi-transparent reflecting surface for combining said beams and directing them to said observation point, view finder frame defining means outside of the path of the range finder beams and including a frame and a positive lens located directly in line with said observation point and semi-transparent reflecting means and in front of said reflecting means, the power of said positive lens and the distance to the frame being such as to form a virtual image of the frame within the range of said range finder which is adapted to be viewed at said observation point simultaneously with said combined range finder beams, and means for transversely adjusting the position of said virtual image of the frame relative to the combined range finder beams in accordance with the distance of said object from the focal plane of the camera lens to correct for parallax.

16. An optical system according to claim 15 in which the means for transversely adjusting the position of said virtual image of the frame includes the focusing mechanism for the camera lens whereby the view finder is automatically corrected for parallax when the lens is focused.

17. An optical system for a combined view and range finder particularly adapted for use on a camera adapted to receive interchangeable focusable lenses of different focal length, and including a mechanism for focusing said lenses, and comprising in combination a beam accepting and combining unit for receiving two spaced beams of light coming from an object and directing them in combined relation to an observation point, said unit including a negative lens in each light beam for forming a virtual image of the object, a split semi-transparent reflecting surface for combining, said beams and directing them to said observation point, view finder frame defining means outside of the path of the range finder beams and including a frame and a positive lens located directly in line with said observation point and semi-transparent reflecting means and in front of said reflecting means, the power of said positive lens and the distance to the frame being such as to form a virtual image of the frame within the range of said range finder which is adapted to be viewed at said observation point simultaneously with said combined range finder beams, and means for transversely adjusting the position of said virtual image of the frame relative to the combined range finder beams in accordance with the distance of said object from the focal plane of the camera lens to correct for parallax, and means for varying the field size of said frame in accordance with the focal length of the camera lens on the camera whereby the field of view of the view finder will correspond with the field of the lens being used.

JOSEPH MIHALYI.